US009425000B2

(12) United States Patent
Lin et al.

(10) Patent No.: US 9,425,000 B2
(45) Date of Patent: Aug. 23, 2016

(54) POROUS CARBON MATERIAL AND MANUFACTURING METHOD THEREOF AND SUPERCAPACITOR

(71) Applicant: INDUSTRIAL TECHNOLOGY RESEARCH INSTITUTE, Hsinchu (TW)

(72) Inventors: Yu-Ming Lin, Tainan (TW); Tsung-Yi Chen, Taichung (TW); Hong-Ping Lin, Taipei (TW); Wen-Ling Lu, Tainan (TW); Ssu-Jung Pan, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 632 days.

(21) Appl. No.: 13/728,700

(22) Filed: Dec. 27, 2012

(65) Prior Publication Data
US 2014/0118884 A1    May 1, 2014

(30) Foreign Application Priority Data
Oct. 30, 2012   (TW) .............................. 101140050 A (51) Int. Cl.
*H01G 9/00*    (2006.01)
*H01G 9/042*    (2006.01)
(Continued)

(52) U.S. Cl.
CPC ................ *H01G 11/24* (2013.01); *C01B 31/00* (2013.01); *C04B 35/14* (2013.01); *C04B 35/524* (2013.01);
(Continued)

(58) Field of Classification Search
CPC ....... H01G 9/155; H01G 9/042; H01G 9/058; H01G 11/00; H01G 11/24; H01G 11/34; H01G 11/44; Y02E 60/13

USPC .......................................................... 361/502
See application file for complete search history.

(56) References Cited

U.S. PATENT DOCUMENTS

| 5,605,727 | A |   | 2/1997 | Bouteiller |
| 5,926,361 | A | * | 7/1999 | Alford .................. H01G 9/155 361/502 |

(Continued)

FOREIGN PATENT DOCUMENTS

| CN | 1231414 C   | 12/2005 |
| CN | 102107863 A | 6/2011  |

(Continued)

OTHER PUBLICATIONS

Japanese Office Action, dated May 22, 2013, for Japanese Application No. 2011-200612.

(Continued)

*Primary Examiner* — Eric Thomas
*Assistant Examiner* — Arun Ramaswamy
(74) *Attorney, Agent, or Firm* — Birch, Stewart, Kolasch & Birch, LLP (57) ABSTRACT

An embodiment provides a manufacturing method for a porous carbon material including: preparing a first solution including a surfactant, a carbon source material and a solvent; pouring the first solution into a silica sol aqueous solution to form a second solution; preparing a silicate aqueous solution; pouring the silicate aqueous solution into the second solution to form a third solution and to precipitate out an intermediate, wherein the intermediate includes the surfactant, the carbon source material and a silica template; performing a heating process on the intermediate to carbonize the intermediate; and removing the silica template of the carbonized intermediate to form a porous carbon material. Another embodiment of the disclosure provides a porous carbon material. The other embodiment provides a supercapacitor.

7 Claims, 6 Drawing Sheets

(51) Int. Cl.
| | |
|---|---|
| *H01G 9/04* | (2006.01) |
| *H01G 11/00* | (2013.01) |
| *H01G 11/24* | (2013.01) |
| *H01G 11/34* | (2013.01) |
| *H01G 11/26* | (2013.01) |
| *H01G 11/44* | (2013.01) |
| *C04B 35/14* | (2006.01) |
| *C04B 35/524* | (2006.01) |
| *C01B 31/00* | (2006.01) |

(52) U.S. Cl.
CPC ............... *H01G 11/26* (2013.01); *H01G 11/34* (2013.01); *H01G 11/44* (2013.01); *C01P 2006/16* (2013.01); *C01P 2006/17* (2013.01); *C04B 2235/3427* (2013.01); *C04B 2235/422* (2013.01); *C04B 2235/5454* (2013.01); *C04B 2235/6028* (2013.01); *Y02E 60/13* (2013.01)

(56) References Cited

U.S. PATENT DOCUMENTS

| | | | |
|---|---|---|---|
| 6,297,293 | B1 | 10/2001 | Bell et al. |
| 6,515,845 | B1 | 2/2003 | Oh et al. |
| 6,737,445 | B2 | 5/2004 | Bell et al. |
| 6,865,068 | B1 | 3/2005 | Murakami et al. |
| 7,091,156 | B2 * | 8/2006 | Hirahara ............... C01B 31/081 361/502 |
| 7,167,354 | B2 | 1/2007 | Dietz et al. |
| 7,666,380 | B2 | 2/2010 | Jaroniec et al. |
| 7,790,600 | B2 | 9/2010 | Jacobs et al. |
| 7,824,646 | B2 | 11/2010 | Cai et al. |
| 7,976,587 | B2 | 7/2011 | Gadkaree et al. |
| 8,119,555 | B2 | 2/2012 | Banerjee et al. |
| 2002/0041957 | A1 | 4/2002 | Ikeda et al. |
| 2003/0064156 | A1 | 4/2003 | Shih et al. |
| 2003/0153638 | A1 | 8/2003 | Lai et al. |
| 2004/0047798 | A1 | 3/2004 | Oh et al. |
| 2004/0063567 | A1 | 4/2004 | Ginosar et al. |
| 2005/0058589 | A1 | 3/2005 | Lundquist et al. |
| 2005/0129604 | A1 | 6/2005 | Pak et al. |
| 2006/0137718 | A1 | 6/2006 | Kin et al. |
| 2007/0189646 | A1 | 8/2007 | Koeniger et al. |
| 2008/0039580 | A1 | 2/2008 | Cai et al. |
| 2008/0152577 | A1 | 6/2008 | Addiego et al. |
| 2008/0287607 | A1 | 11/2008 | Tai Chen et al. |
| 2009/0038632 | A1 | 2/2009 | Cashmore et al. |
| 2009/0166577 | A1 | 7/2009 | Peng et al. |
| 2011/0082024 | A1 | 4/2011 | Liu et al. |
| 2011/0134585 | A1 | 6/2011 | Shen et al. |
| 2012/0094828 | A1 | 4/2012 | Pfeifer et al. |
| 2012/0237748 | A1 | 9/2012 | Lin et al. |

FOREIGN PATENT DOCUMENTS

| | | |
|---|---|---|
| EP | 0688851 A1 | 12/1995 |
| EP | 1655267 A2 | 5/2006 |
| JP | 2001-89119 A | 4/2001 |
| JP | 2004-59904 A | 2/2004 |
| JP | 2005-752 A | 1/2005 |
| JP | 2005-93984 A | 4/2005 |
| JP | 2005-154268 A | 6/2005 |
| JP | 2005-239450 A | 9/2005 |
| JP | 2007-8790 A | 1/2007 |
| JP | 2007-169148 A | 7/2007 |
| JP | 2008-44816 A | 2/2008 |
| JP | 2009-82765 A | 4/2009 |
| JP | 2010-513215 A | 4/2010 |
| JP | 2010-105836 A | 5/2010 |
| JP | 2011-20907 A | 2/2011 |
| JP | 2011-525468 A | 9/2011 |
| TW | 472090 B | 1/2002 |
| TW | 508380 B | 11/2002 |
| TW | 520383 B | 2/2003 |
| TW | I230619 B | 4/2005 |
| TW | I247345 B | 1/2006 |
| TW | 200615400 | 5/2006 |
| TW | I274453 B | 2/2007 |
| TW | 200711713 | 4/2007 |
| TW | 200929286 A | 7/2009 |
| TW | I314169 B | 9/2009 |
| TW | I323747 B | 4/2010 |
| TW | 201024219 A | 7/2010 |
| TW | 201121888 A1 | 7/2011 |
| TW | 201142874 A | 12/2011 |
| TW | 201238893 A1 | 10/2012 |
| WO | WO 2010/000778 A1 | 1/2010 |

OTHER PUBLICATIONS

Alvarez et al., "Template synthesis of mesoporous carbons with tailorable pore size and porosity" Letters to the Editor / Carbon 42 (2004), pp. 433-436.
Beck et al., "A New Family of Mesoporous Molecular Sieves Prepared with Liquid Crystal Templates", J. Am. Chem. Sot. (1992), 114, pp. 10834-10843.
Chakraborty et al., "Alkylation of naphthalene with alcohols over mesoporous MCM-41", Catalysis Letters 39 (1996), pp. 63-65.
Choma et al., "Development of Microporosity in Mesoporous Carbons", Top Catal (2010) 53, pp. 283-290.
Fuertes et al., "Control of mesoporous structure of carbons synthesised using a mesostructured silica as template", Microporous and Mesoporous Materials 62 (2003), pp. 177-190.
Kresge et al., "Ordered Mesoporous Molecular Sieves synthesized by liquid-crystal template mechanism", Letters to Nature, vol. 359, Oct. 22, 1992, pp. 710-712.
Liu et al., "A simplified preparation of mesoporous carbon and the examination of the carbon accessibility for electric double layer formation", Carbon 43 (2005), pp. 559-566.
Ryoo et al., "Ordered Mesoporous Carbons", Adv. Mater. 13, No. 9, May 3, 2001, pp. 677-681.
Sevilla et al., "Performance of templated mesoporous carbons in supercapacitors", Electrochimica Acta 52 (2007), pp. 3207-3215.
Sheng-Hao Wu, "Synthesis of Mesoporous Carbon in Different forms by Using Various Phenol-Formaldehyde Sources and Different Synthestic methods," Jun. 2007, 132 pages (including English Abstract).
US Office Action for U.S. Appl. No. 13/206,944 dated May 28, 2013.

* cited by examiner

POROUS CARBON MATERIAL AND MANUFACTURING METHOD THEREOF AND SUPERCAPACITOR

CROSS REFERENCE TO RELATED APPLICATIONS

This application claims priority of Taiwan Patent Application No. 101140050, filed on Oct. 30, 2012, the entirety of which is incorporated by reference herein.

BACKGROUND

1. Field

The present disclosure relates to a porous material, and in particular relates to a porous carbon material and manufacturing methods thereof, and a supercapacitor using the same.

2. Description of the Related Art

Supercapacitors represent revolutionary developments in energy storage, and may replace traditional storage batteries in certain fields in the future. The supercapacitor is a new energy storage device that exists due to advancements in material science. The supercapacitor is a new electrochemical device, which stores electrical energy via the polarization between an electrolytic solution and the surface of a carbon electrode. The global need for supercapacitors has risen quickly since commercial market availability, and they have become a new superstar in the field of electrochemical power. The supercapacitor has a huge application value and market potential in such applications as electric vehicles, mixed-fuel vehicles, exceptional-load vehicles, electrical power, railroads, communication, national defense, and consumer electronic products.

The supercapacitor has the advantages of having a high charge-discharge speed, being pollution-free, and having a long cycle life, so the supercapacitor is regarded as a new type of green energy storage system for the present century. In view of the usage qualities of electrical power, the supercapacitor has many advantages over batteries, such as a higher output power (>10 kW/kg), higher charge-discharge efficiency, and longer cycle life (>200,000 times). The supercapacitor may raise the instantaneous power and may recharge during braking. In view of energy savings, the supercapacitor is an indispensable auxiliary energy source. Also, the characteristic high discharge speed of the supercapacitor means it can be used in uninterruptible power supplies, and the supercapacitor can provide electric energy immediately at the moment of a power failure to recover the essential response time of batteries.

In general, the electrode of a supercapacitor is mainly made of a porous structure, which may be of a micro- or nanometer scale with a large surface area used to produce an electric double layer of an electrostatic-charge storage device. Specifically, the supercapacitor stores electrical energy by directly forming electrostatic charges on the electrode plate of the capacitor, and this kind of charge storage is called non-Faradic which means that there is no electron transfer occurring on the interface of the electrode.

The present commercial supercapacitor is limited by the small specific surface area (500-1000 m2/g) of the carbon electrode material thereof, such that the energy density thereof is lower (<5 Wh/kg), and the electrical capacity thereof is around 5-35 F/g. A carbon electrode material that is highly porous and has a large surface area can effectively improve the total efficiency of the supercapacitor, but the present manufacturing method of this kind of carbon electrode material (referring TW patent NO. I274453) involves a long processing time (about 3-7 days) and high energy (a process temperature is 2000° C.).

SUMMARY

An embodiment of the disclosure provides a manufacturing method of a porous carbon material which includes: preparing a first solution including a surfactant, a carbon source material, and a solvent; pouring the first solution into a silica sol aqueous solution to form a second solution; preparing a silicate aqueous solution; pouring the silicate aqueous solution into the second solution to form a third solution and to precipitate out an intermediate, wherein the intermediate comprises the surfactant, the carbon source material, and a silica template; performing a heating process on the intermediate to carbonize the intermediate; and removing the silica template of the carbonized intermediate to form a porous carbon material.

An embodiment of the disclosure provides a porous carbon material, which includes: a porous carbon structure having a plurality of macropores, a plurality of mesopores, and a plurality of micropores, wherein each of the macropores has a diameter larger than 50 nanometers, each of the mesopores has a diameter ranging from 2 nanometers to 50 nanometers, and each of the micropores has a diameter less than 2 nanometers, wherein based on the total pore volume of the porous carbon structure, a distribution proportion of the pore volume of the macropores ranges from 10-25%, a distribution proportion of the pore volume of the mesopores ranges from 20-80%, and a distribution proportion of the pore volume of the micropores ranges from 0.01-20%, wherein the mesopores have three main pore diameters, wherein the three main pore diameters are 2-4 nm, 5-15 nm and 20-50 nm, respectively.

An embodiment of the disclosure provides a supercapacitor, which includes: a first electrode; a second electrode; an separator film sandwiched between the first electrode and the second electrode; a carbon electrode comprising a porous carbon material, wherein the carbon electrode is disposed between the first electrode and the separator film and between the second electrode and the separator film; and an electrolytic solution disposed between the first electrode and the separator film and between the second electrode and the separator film to fill the macropores, the mesopores and the micropores of the porous carbon structure of the porous carbon material.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION

In the present disclosure, an aqueous solution including a surfactant, a carbon source material and a silica sol is mixed with a silicate aqueous solution to form an organic and inorganic composite including the surfactant, the carbon source material and a silica, and then the organic and inorganic composite is carbonized and the silica is removed therefrom to form a porous carbon material with a plurality of macropores, a plurality of mesopores and a plurality of micropores, wherein the mesopores have three main pore sizes.

Figure 1:
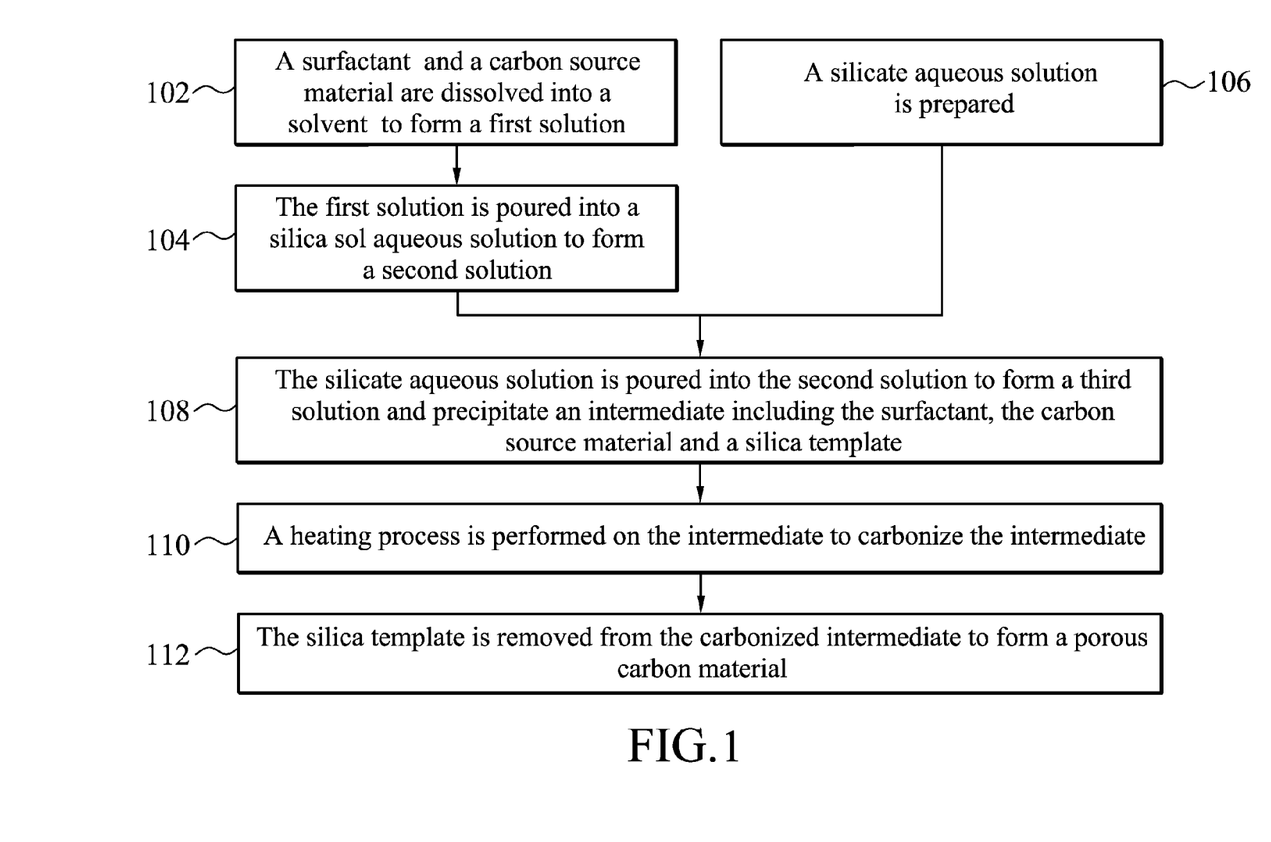
FIG. 1 depicts a manufacturing flow chart of a porous carbon material according to an embodiment of the present disclosure.

FIG. 1 depicts a manufacturing flow chart of a porous carbon material according to an embodiment of the present disclosure. Referring to FIG. 1, in step 102, a first solution is prepared, wherein the first solution includes a surfactant, a carbon source material and a solvent.

Specifically, in step 102, the surfactant is disposed in a solvent and then the solvent is stirred. A carbon source material is dissolved into a solvent and then the solvent is stirred. Then, the solvent dissolved with the surfactant is poured into the solvent dissolved with the carbon source material, and then the solvents are stirred to completely react with each other to form the first solution.

Specifically, the solvent is, for example, water, alcohol, a combination thereof, or another suitable solvent material, wherein the alcohol is, for example, ethanol. In one embodiment, the solvent includes water and ethanol, wherein the volume ratio of water to ethanol is 1:2. In other embodiments, the volume ratio of water to ethanol is 1:1, 5:1, or 10:1.

The surfactant includes neutral surfactants, cationic surfactants or anionic surfactants. The surfactant is, for example, polyvinyl alcohol, gelatin, EO-PO triblock copolymer ($EO_{106}PO_{70}EO_{106}$, Pluronic F127), polyethylene glycol (PEG10000), a combination thereof, or another suitable surfactant material.

The carbon source material is composed of, for example, thermosetting resins, thermoplastic resins, or other low molecular weight hydrocarbons, such as sucrose or tar. Specifically, the carbon source material is composed of, for example, phenolic resins, crosslinked and non-crosslinked polyacrylonitrile copolymers, sulfonated crosslinked polystyrene copolymers, modified crosslinked polystyrene copolymers, crosslinked sucrose, poly(furfuryl alcohol), polyvinyl chloride, combinations thereof, or other suitable carbon source materials, wherein the phenolic resin is, for example, a phenol-formaldehyde condensation copolymer or resorcinol-formaldehyde condensation copolymer.

In step 104, the first solution is poured into a silica sol aqueous solution to form a second solution. In one embodiment, the manufacturing method of the silica sol aqueous solution includes uniformly mixing a nano-silica sol and water. Specifically, after pouring the first solution into the silica sol aqueous solution, the first solution and the silica sol aqueous solution may be stirred to be uniformly mixed with each other. In one embodiment, the silica sol of the silica sol aqueous solution has a diameter ranging from about 10 nm to about 50 nm.

In step 106, a silicate aqueous solution is prepared. The silicate aqueous solution is, for example, a sodium silicate aqueous solution.

In step 108, the silicate aqueous solution is poured into the second solution to form a third solution and precipitate an intermediate including the surfactant, the carbon source material, and a silica template. In one embodiment, the weight ratio of the carbon to the silica in the third solution ranges from about 1:1 to about 1:10.

In one embodiment, a 6M sulfuric acid solution may be added into the third solution to adjust the pH value of the third solution, such that the third solution is weakly acidic. For example, the pH value of the third solution is about 6. Then, the third solution is filtered to filter out the intermediate and then dry the intermediate.

In step 110, a heating process is performed on the intermediate to carbonize the intermediate. Specifically, in step 110, the intermediate may be disposed into a quartz tube which may be disposed into a high-temperature furnace to heat the intermediate in a nitrogen or argon atmosphere at a carbonized temperature for hours to carbonize the intermediate. In one embodiment, the heating process is performed on the intermediate at, for example, 500° C.-2200° C. (e.g. 800° C.) for 1 hour to 3 hours (e.g. 2 hours).

In step 112, the silica template is removed from the carbonized intermediate to form a porous carbon material. Specifically, in step 112, the carbonized intermediate is disposed in a strong acid solution or a strong base solution to remove the silica template. For example, the silica template is removed by using the hydrofluoric acid solution. Specifically, a concentration of the hydrofluoric acid solution is, for example, 4.8 wt %, and a weight ratio of the silica template to the hydrofluoric acid solution is 1:50.

According to the above description, in the present embodiment, the carbon source material and the surfactant are used as a carbonaceous material, and the sodium silicate and the silica sol are used as a precursor of the silica template. The carbonaceous material and the silica template precursor are mixed to form a carbonaceous material-silica template composite (i.e. the intermediate), and then a heating process is performed on the carbonaceous material-silica template composite to form a carbon-silica template composite (i.e. the carbonized intermediate), and than the silica template may be removed to form the porous carbon material.

The structure of the porous carbon material formed by the manufacturing method described above is described as follows in detail.

The porous carbon material of the present embodiment includes a porous carbon structure having a plurality of macropores, a plurality of mesopores and a plurality of micropores, wherein each of the macropores has a diameter larger than 50 nanometers, each of the mesopores has a diameter ranging from 2 nanometers to 50 nanometers, and each of the micropores has a diameter less than 2 nanometers. A specific surface area of the porous carbon structure may range from about 1000 square meters per gram to 2500 square meters per gram. The total pore volume of the porous carbon structure ranges from 2 cubic centimeters per gram to 6 cubic centimeters per gram.

The distribution proportion of the pore volume of the macropores may range from 10-25%, the distribution proportion of the pore volume of the mesopores may range from 20-80%, the distribution proportion of the pore volume of the micropores may range from 0.01-20%, based on the total pore volume of the porous carbon structure. The mesopores have three main pore diameters, wherein the three main pore diameters are 2-4 nm, 5-15 nm and 20-50 nm, respectively.

In one embodiment, the distribution proportion of the pore volume of the mesopores with the diameter of 2-4 nm may range from 5-20%, the distribution proportion of the pore volume of the mesopores with the diameter of 5-15 nm may range from 15-35%, and the distribution proportion of the pore volume of the mesopores with the diameter of 20-50 nm may range from 20-40%, based on the total pore volume of the mesopores.

In one embodiment, the three main pore diameters are 3 nm, 12 nm and 25 nm, respectively. In one embodiment, the average pore diameter of the porous carbon structure ranges from about 2 nm to about 15 nm.

In general, when the porous carbon material is used in a carbon electrode of a supercapacitor, pore sizes of the porous carbon material may affect the specific capacitance of the charge storage of the supercapacitor. Specifically, increasing the number of micropores may effectively increase the specific surface area of the carbon electrode, and therefore effectively increase the specific capacitance. Furthermore, the mesopores and the macropores may help the charges of the electrolyte used in the supercapacitor to be transmitted quickly.

The porous carbon materials formed by conventional technology may be roughly categorized into two types. One type of porous carbon material is a micropores carbon material with a large number of micropores (the distribution proportion of the specific surface area of the micropores is larger than 85%, based on the total specific surface area of the micropores carbon material). Another type porous carbon material is a macropores carbon material with a large number of macropores.

However, if the distribution proportion of the specific surface area of the micropores of the porous carbon material is too high, the porous carbon material lacks the mesopores and the macropores, and therefore the electrolyte is hardly transmitted into the interior of the porous carbon material, so that merely the outer surface of the porous carbon material is suitable for storing charges, which decreases the specific capacitance of the supercapacitor. Moreover, if the distribution proportion of the specific surface area of the macropores of the porous carbon material is too high, the total specific surface area of the porous carbon material is small, which decreases the specific capacitance of the supercapacitor.

It can be seen from the above that the present disclosure forms a porous carbon material with micropores, mesopores, and macropores, and therefore when the porous carbon material is used in the carbon electrode of the supercapacitor, the micropores may effectively increase the surface area of the carbon electrode (1000~2500 m$^2$/g), the mesopores and the macropores may be charge-transmitting channels (the distribution proportion of the specific surface area of the macropores ranges from 10-25%, and the distribution proportion of the specific surface area of the mesopores ranges from 20-80%), such that the charges of the electrolyte may be smoothly transmitted to the surface of the micropores located in the outer surface and the interior of the carbon electrode through the mesopores and the macropores. As such, the usable thickness of the carbon electrode may be increased, and the surface area of the micropores of the carbon electrode may be used completely, which helps to increase the amount of storage charges and quickly transmit the charges of the electrolyte.

It should be noted that, in the present disclosure, the mesopores have three main pore diameters (2-4 nm, 5-15 nm and 20-50 nm). Thus, the carbon electrode using the porous carbon material of the present disclosure is suitable to be operated in an ionic liquid electrolytic solution with a high operating voltage, so a supercapacitor using the carbon electrode has a high energy density, wherein the single ion diameter of the ionic liquid electrolytic solution ranges from about 2 nm-3 nm, and the solvated ion diameter of the ionic liquid electrolytic solution is larger than 5 nm. Of course, the carbon electrode using the porous carbon material of the present disclosure is also suitable to be operated in an organic solvent electrolytic solution.

A supercapacitor using the porous carbon material described above is described as follows in detail.

Figure 2:
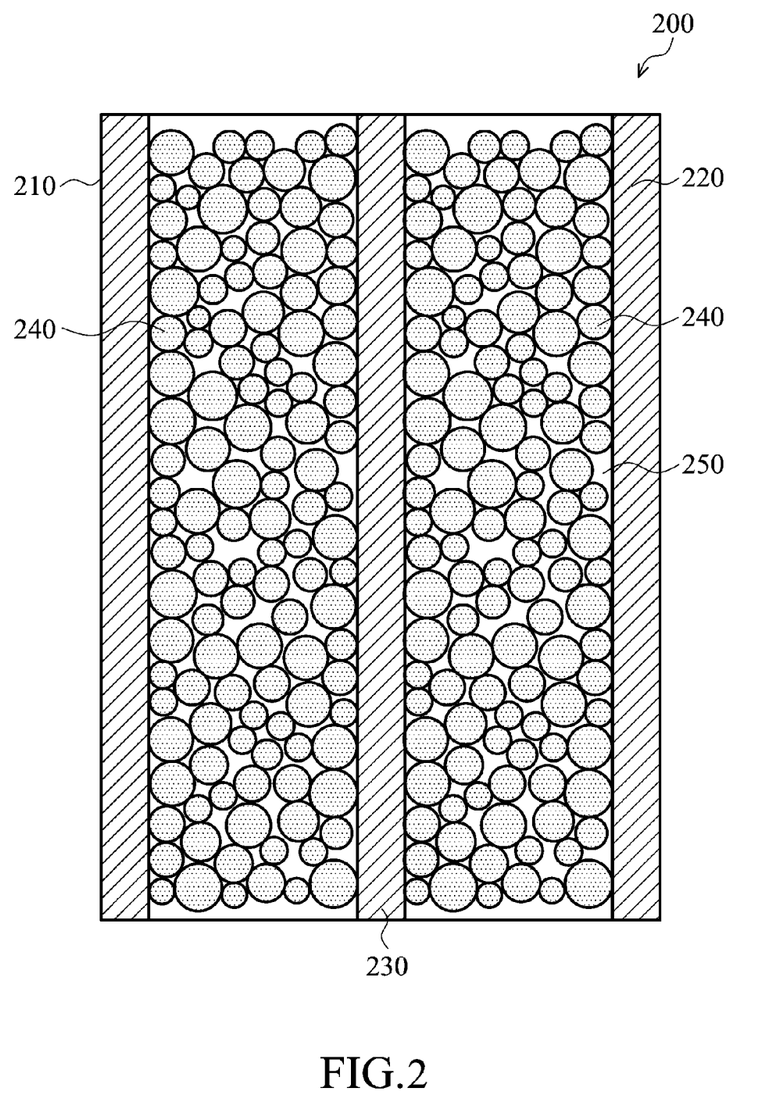
FIG. 2 is a cross-sectional view of a supercapacitor according to an embodiment of the present disclosure.

FIG. 2 is cross-sectional view of a supercapacitor according to an embodiment of the present disclosure. Referring to FIG. 2, in the present embodiment, a supercapacitor 200 includes a first electrode 210, a second electrode 220, a separator film 230, a carbon electrode 240 and an electrolytic solution 250. The separator film 230 is sandwiched between the first electrode 210 and the second electrode 220. The separator film 230 includes, for example, cellulose. The first electrode 210 and the second electrode 220 include, for example, stainless steel or other materials with good conductive properties. The carbon electrode 240 includes the porous carbon material mentioned above and is disposed between the first electrode 210 and the separator film 230 and between the second electrode 220 and the separator film 230.

The electrolytic solution 250 is disposed between the first electrode 210 and the separator film 230 and between the second electrode 220 and the separator film 230 to fill the macropores, the mesopores and the micropores (not shown) of the porous carbon structure of the porous carbon material. In one embodiment, the electrolytic solution 250 is an ionic liquid electrolytic solution, an organic solvent electrolytic solution or an aqueous solution electrolytic solution. The ionic liquid electrolytic solution has an operating voltage ranging, for example, from about 3.6V to about 5V. The organic solvent electrolytic solution has an operating voltage ranging, for example, from about 2V to about 2.7V. The aqueous solution electrolytic solution has an operating voltage ranging, for example, from about 1V to about 1.2V.

In one embodiment, the carbon electrode 240 may further include a binder (not shown) mixed with the porous carbon material. In one embodiment, the binder is a fluoro binder (e.g. PIPE), and the weight ratio of the binder to the porous carbon material ranges from 5% to 15%.

The manufacturing methods of the porous carbon materials according to one embodiment and a comparative example of the present disclosure will be illustrated as follows. It should be noted that the comparative example is designed by the applicant to be compared with the embodiment of the present disclosure and is not a prior art. In the embodiment and the comparative example bellow, the surfactant is polyvinyl alcohol, and the carbon source material is phenolic resin (Phenolic resin PF-2180, ChangChun Plastics. Co. Ltd.). The embodiment and the comparative example below have a roughly similar experimental process and merely a portion of the processing steps are different, so merely the embodiment is described in detail, and the comparative example is merely described with the processing steps that are different from the embodiment.

Embodiment

Firstly, 2 grams of the surfactant were added into 20 grams of deionized water and were stirred to dissolve in the deionized water and form a solution A. 2 grams of carbon source material and 2 grams of sodium hydroxide were added into 20 grams of deionized water and were stirred to dissolve in the deionized water and form a solution B. When the solutes in the solutions A and B were completely dissolved therein respectively, the solution A was poured into the solution B and was stirred for 3-4 hours to react with each other and form a solution C.

10 grams of nano-silica sol (Dupont, Ludox AS-40) and 100 grams of deionized water were uniformly mixed with each other to form a nano-silica sol aqueous solution (referred to as "solution D" hereinafter). The solution C was poured into the solution D and was stirred for 1 hour to be uniformly mixed with the solution D and form a solution E.

4 grams of sodium silicate aqueous solution (Sigma-Aldrich, sodium silicate solution) were uniformly mixed with 20 grams of deionized water to form a sodium silicate aqueous solution (referred to as "solution F" hereinafter). The solution F was poured into the solution E and was stirred for 10-15 minutes to form a solution G. Then, a 6M sulfuric acid solution was added into the solution G to lower the pH value of the solution G to 6 (the original pH value of the solution G was 11) and was stirred with the solution G for 10-15 minutes to completely react with the solution G and form a solution H.

Then, the solution H was filtered to provide a filter cake, and the filter cake was dried for one day to form a carbon source material-silica template composite. The composite was disposed into a quartz tube to be carbonized and form a carbon-silica template composite, wherein the carbonizing temperature was 800° C.

A 5% hydrofluoric acid aqueous solution was mixed with the composite to remove the silica template and form a mixed solution. Then, the mixed solution was filtered to provide a filter cake, and the filter cake was washed by deionized water until the deionized water washing the filter cake was neutral. Then, the filter cake was dried to form a porous carbon material of the present embodiment.

Comparative Example

The main difference between the comparative example and the embodiment is that the comparative example did not use the sodium silicate aqueous solution.

Solutions C and D are manufactured by the method the same as that of the embodiment. Then, the solution C was poured into the solution D and was stirred for 1-2 hours to be uniformly mixed with the solution D and form a solution E. Then, a 6M sulfuric acid solution was added into the solution E to lower the pH value of the solution E to 6 (the original pH value of the solution E was 11) and was stirred with the solution E for 10-15 minutes to completely react with the solution E and form a solution F.

Then, the solution F was filtered to provide a filter cake, and the filter cake was dried for one day to form a carbon source material-silica template composite. The composite was disposed into a quartz tube to be carbonized and form a carbon-silica template composite, wherein the carbonizing temperature was 800° C.

A 5% hydrofluoric acid aqueous solution was mixed with the composite to remove the silica template and form a mixed solution. Then, the mixed solution was filtered to provide a filter cake, and the filter cake was washed by deionized water until the deionized water washing the filter cake was neutral. Then, the filter cake was dried to form a porous carbon material of the comparative example For comparing with traditional active carbon, the applicant uses traditional active carbon processed by an activating process and having a high specific surface area (provided by China Steel Chemical Corporation) to perform a porous property analysis and compare with the porous carbon materials of the embodiment and the comparative example, and the analysis result is shown in FIGS. 3 and 4 and Tables 1-3.

Figure 3:
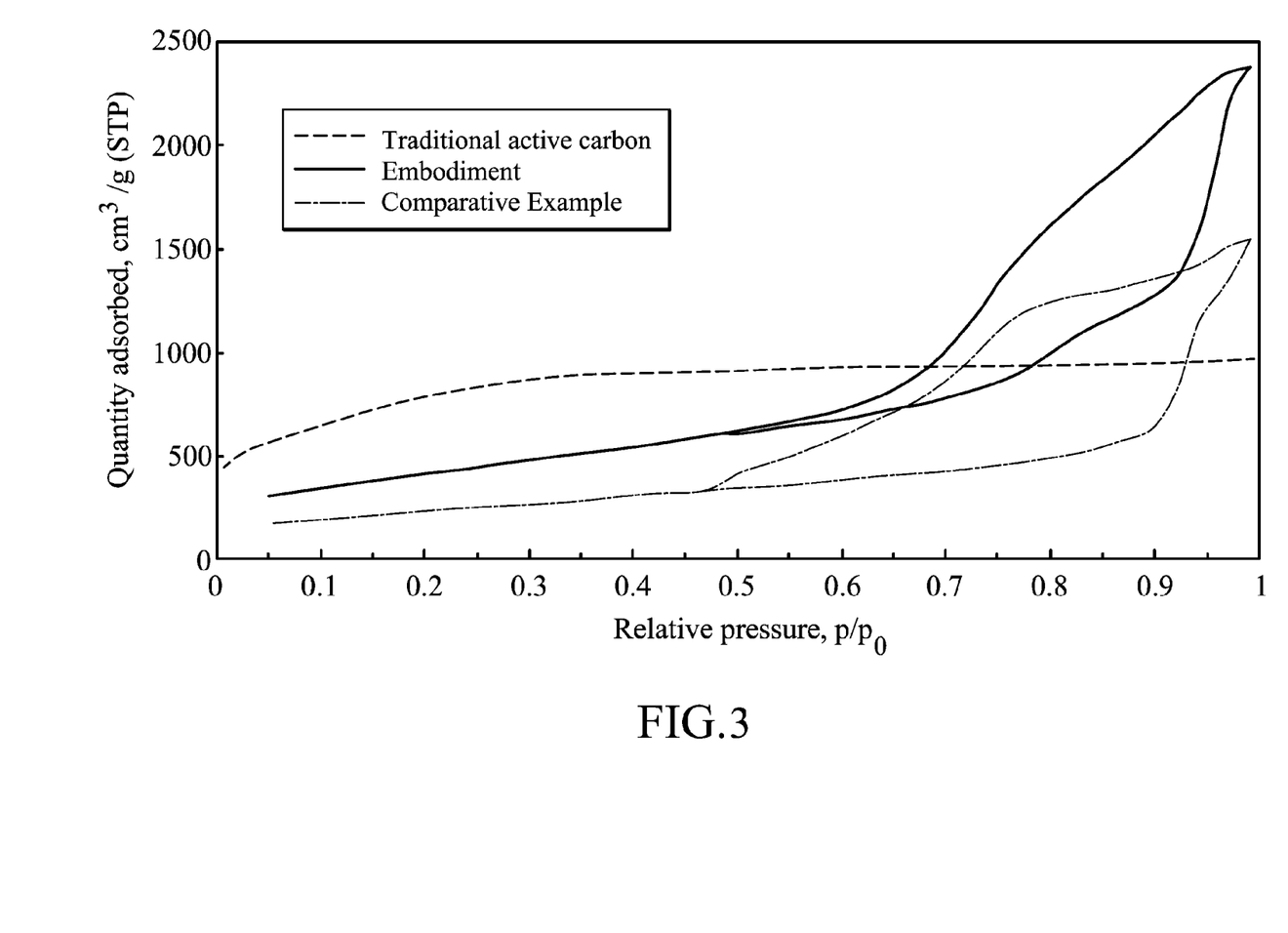
FIG. 3 is a curve diagram showing the nitrogen adsorption/desorption curves of the porous carbon materials of the embodiment and the comparative example and the traditional active carbon, wherein the curve diagram is measured by a nitrogen adsorption/desorption isotherm analyzer.
Figure 4:
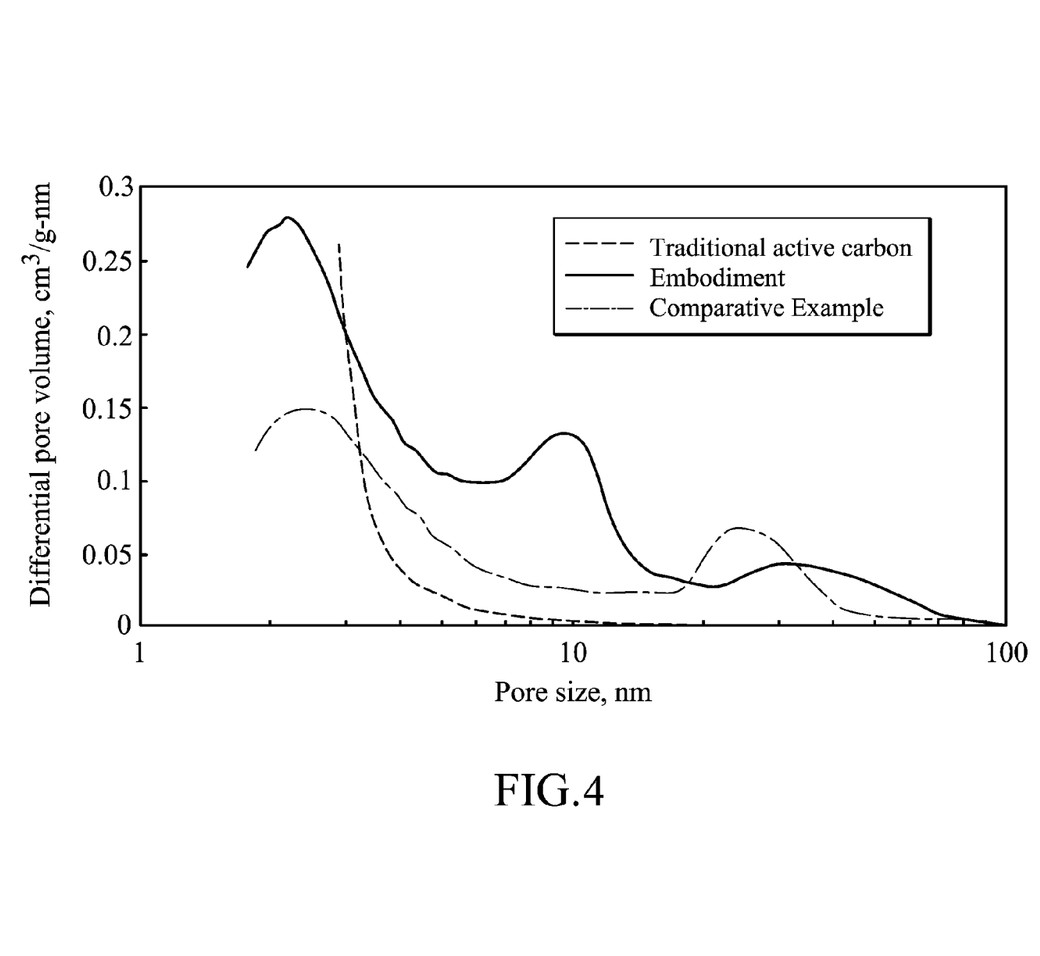
FIG. 4 is a curve diagram showing the pore size (the pore diameter) distribution curves of the porous carbon materials of the embodiment, the comparative example and the traditional active carbon, wherein the curve diagram is calculated using the Barrett-Joyner-Halenda (BJH) model.

FIG. 3 is a curve diagram showing that nitrogen adsorption/desorption curves of the porous carbon materials of the embodiment and the comparative example and the traditional active carbon, wherein the curve diagram is measured by a nitrogen adsorption/desorption isotherm analyzer. FIG. 4 is a curve diagram showing that the pore size (the pore diameter) distribution curves of the porous carbon materials of the embodiment and the comparative example and the traditional active carbon, wherein the curve diagram is calculated using the Barrett-Joyner-Halenda (BJH) model. Table 1 shows the specific surface areas of the porous carbon materials and the traditional active carbon calculated using the Brunauer-Emmett-Teller (BET) model.

TABLE 1

|  | Specific surface area ($m^2/g$) | Average pore size (nm) | Pore volume ($cm^3/g$) |
|---|---|---|---|
| Embodiment | 1,498 | 9.6 | 3.59 |
| Comparative example | 828 | 11.2 | 2.32 |
| Traditional active carbon | 2,709 | 2.2 | 1.49 |

TABLE 2

|  | Volume ratio of micropores (<2 nm) (%) | Volume ratio of mesopores (2-50 nm) (%) | Volume ratio of macropores (>50 nm) (%) |
|---|---|---|---|
| Embodiment | 9.3 | 73.3 | 17.5 |
| Comparative example | 8.0 | 73.7 | 18.3 |
| Traditional active carbon | 79.2 | 17.8 | 3.0 |

TABLE 3

|  | R1 | R2 | R3 | R1 + R2 + R3 |
|---|---|---|---|---|
|  | Volume ratio of mesopores (%) | | | |
|  | mesopores with diameters of 2-4 nm | mesopores with diameters of 4-15 nm | mesopores with diameters of 16-50 nm | mesopores with diameters of 2-50 nm |
| Embodiment | 8.2 | 26.0 | 39.1 | 73.3 |
| Comparative example | 7.0 | 15.2 | 51.5 | 73.7 |
| Traditional active carbon | 8.3 | 6.3 | 3.2 | 17.8 |

It can be known from FIG. 4 that the porous carbon material of the present embodiment formed by the silica template precursor composed of the sodium silicate and the nano-silica sol has three main pore sizes (i.e. the pore diameters) respectively ranging from about 2 nm to about 4 nm, about 12 nm and about 25 nm. Comparing with the comparative example and the traditional active carbon, the porous carbon material of the embodiment has a higher pore volume ratio of the pores with diameters ranging from 2 nm to 15 nm to the total pores of the porous carbon material.

By contrast, in the comparative example, the silica template precursor is the nano-silica sol, wherein the particle size of the nano-silica sol is large (about 22 nm), and thus the pore size of the porous carbon material is large (about 23 nm), and the mesopores of the porous carbon material has only one main pore size. Because the pore size of the porous carbon material of the comparative example is larger than that of the embodiment, the specific surface area (828 m$^2$/g) of the porous carbon material of the comparative example is smaller than the specific surface area (1498 m$^2$/g) of the porous carbon material of the embodiment.

The pores of the traditional active carbon are mainly micropores (79.2%), so the electrolyte cannot easily reach the interior of the traditional active carbon.

The manufacturing method of a supercapacitor is illustrated as follows.

Firstly, the nanoporous carbon material is mixed with a 10% PTFE binder to form a mixture, and then the mixture is disposed on two stainless steel current collecting plates (with a thickness of 50 μm) to form two carbon electrode films, wherein the weight of the carbon material is about 0.2 mg. The two carbon electrode films are disposed opposite to each other, and a porous separator film is disposed therebetween. The porous separator film was made of cellulose (product name: TF-40).

The two stainless steel current collecting plates are wrapped in a filter paper and then are clipped by two Teflon clip plates. Then, the two stainless steel current collecting plates are fixed by tightening plastic screws with a torque of 0.7 kgf·cm. The structure described above is disposed in a vacuum oven to be dried for 2 hours at 70° C., and then 0.01 ml of ionic liquid used as an electrolytic solution is filled into the gap between the two stainless steel current collecting plates after the structure is cooled down. Let the structure sit for 30 minutes, such that the electrolytic solution permeates into the pores of the carbon electrode films to form a supercapacitor.

Then, a charging/discharging test may be carried out with the supercapacitor to measure the energy density of the supercapacitor.

The charge rate is 1 mA. The discharge rates are 1 mA, 2 mA, 4 mA, 9 mA and 19 mA. Each of the discharge rates is performed four times and the four experimental results are averaged. The condition of the charging/discharging test carried out with the supercapacitor using the ionic liquid as the electrolyte includes: charging the supercapacitor from 0 V to 3.6 V; and then discharging the supercapacitor from 3.6 V to 0 V. The energy density of the carbon electrode films is calculated based on the charging/discharging test results.

Figure 5:
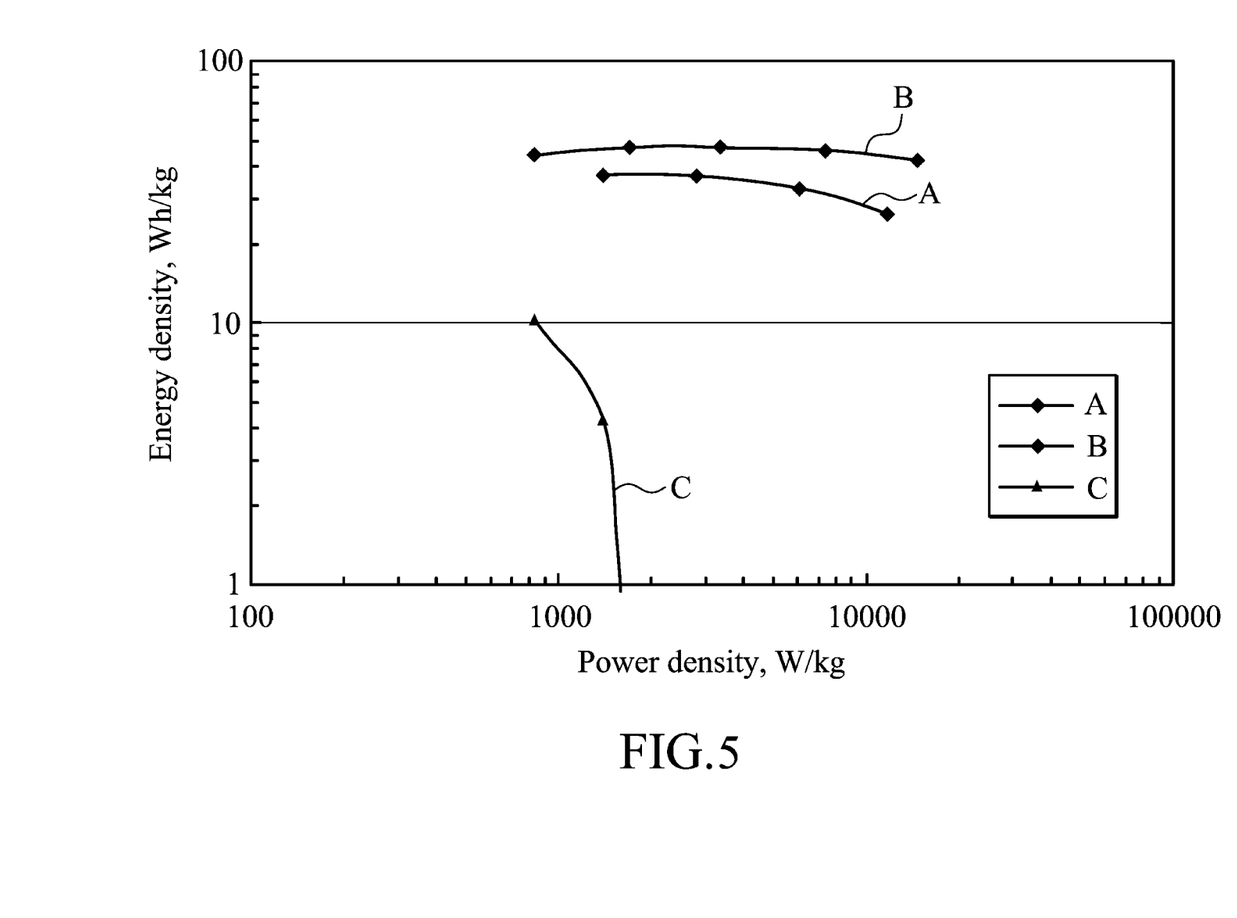
FIG. 5 is a curve diagram showing relation curves of energy density vs. power density of supercapacitors using the ionic liquid electrolytic solution.

FIG. 5 is a curve diagram showing relation curves of the energy density vs. power density of supercapacitors using the ionic liquid electrolytic solution. In FIG. 5, the mark A represents a supercapacitor using the porous carbon material of the embodiment as the carbon electrode and using the ionic liquid electrolytic solution (FUSOL MATERIAL CO., LTD., EMITFSI, 1-Ethyl-3-methylimidazolium bis(trifluoromethylsulfonyl)imide). The mark B represents a supercapacitor using the porous carbon material of the embodiment as the carbon electrode and using the ionic liquid electrolytic solution (PMITFSI, 1-propyl-3-methylimidazolium bis(trifluoromethylsulfonyl)imide, synthesized by the applicant). The mark C represents a supercapacitor using the porous carbon material of the comparative example as the carbon electrode and using the ionic liquid electrolytic solution (EMITFSI).

FIG. 5 shows that the pore size of the porous carbon material of the embodiment is suitable for the ionic liquid electrolytic solution, which improves the energy density of the supercapacitors A and B. The pore size of the porous carbon material of the comparative example is not suitable for the ionic liquid electrolytic solution, so the supercapacitor C has a poor capacitive property. Because the traditional active carbon is not completely suitable for the ionic liquid electrolytic solution, so the energy density of the supercapacitor using the traditional active carbon as electrodes is close to zero and thus cannot be shown in FIG. 5.

Figure 6:
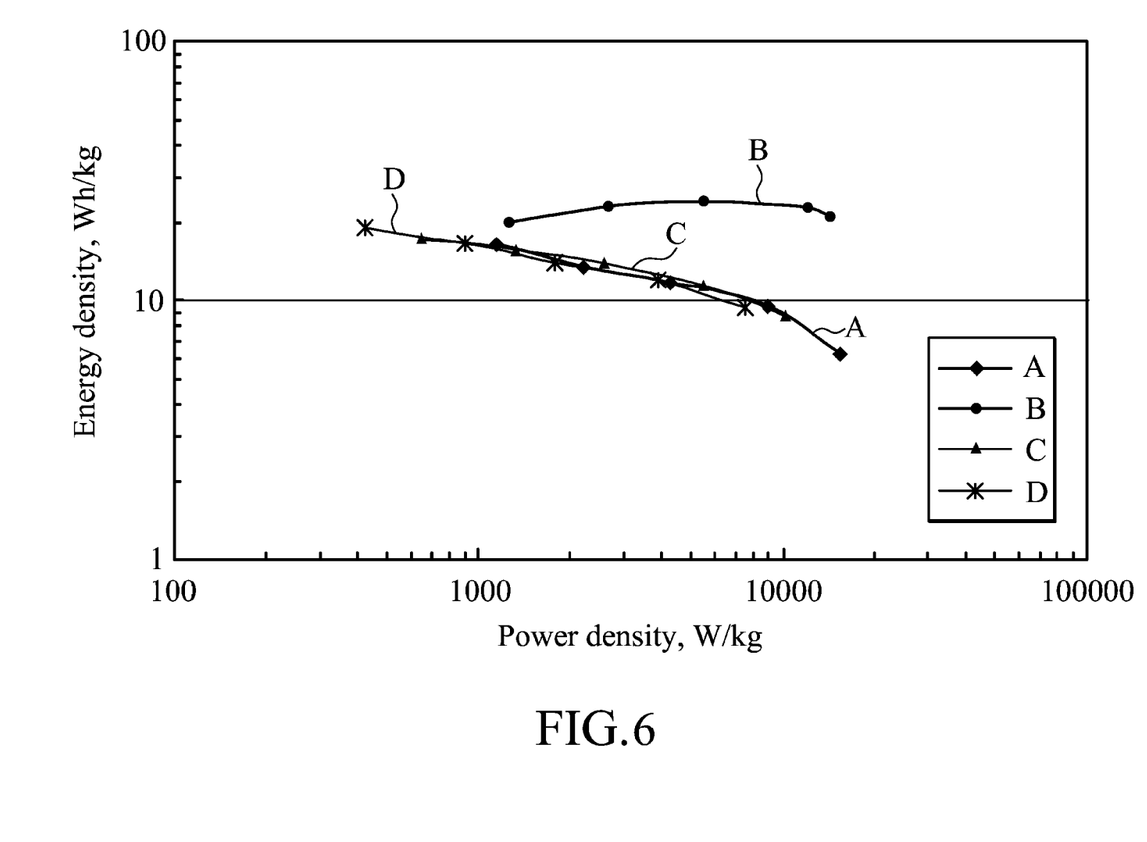
FIG. 6 is a curve diagram showing relation curves of energy density vs. power density of supercapacitors using the organic solvent electrolytic solution.

FIG. 6 is a curve diagram showing relation curves of the energy density vs. power density of supercapacitors using the organic solvent electrolytic solution. In FIG. 6, the manufacturing processes and the charging/discharging test of the supercapacitors are substantially similar to that of FIG. 5, except that the carbon electrode of FIG. 6 is not added with 10% PTFE binder, the electrolytic solution is an organic solvent electrolytic solution, and the condition of the charging/discharging test carried out with the supercapacitor using the organic solvent electrolytic solution includes: charging the supercapacitor from 0 V to 2 V; and then discharging the supercapacitor from 2 V to 0 V. The energy density of the carbon electrode films is calculated based on the charging/discharging test results.

In FIG. 6, the mark A represents a supercapacitor using the porous carbon material of the embodiment as the carbon electrode and using the organic solvent electrolytic solution (LiClO$_4$/PC (propylene carbonate)). The mark B represents a supercapacitor using the porous carbon material of the embodiment as the carbon electrode and using the organic solvent electrolytic solution (TEABF4 (tetraethyl ammonium tetrafluoroborate)/PC). The mark C represents a supercapacitor using the porous carbon material of the comparative example as the carbon electrode and using the organic solvent electrolytic solution (LiClO$_4$/PC). The mark D represents a supercapacitor using the traditional active carbon as the carbon electrode and using the organic solvent electrolytic solution (LiClO$_4$/PC).

FIG. 6 shows that the pore size of the porous carbon material of the embodiment is suitable for the organic solvent electrolytic solution, which leads to the good capacitive properties of the supercapacitors A and B.

In view of the foregoing, in the present disclosure, the sodium silicate and the silica sol are used as a silica template precursor to form a porous carbon material with a plurality of macropores, a plurality of mesopores and a plurality of micropores, wherein the mesopores have three main pore sizes (2-4 nm, 5-15 nm and 20-50 nm). Thus, the carbon electrode using the porous carbon material of the present disclosure is suitable to be operated in an ionic liquid electrolytic solution with a high operating voltage, so a supercapacitor using the carbon electrode has a high energy density, wherein the single ion diameter of the ionic liquid electrolytic solution ranges from about 2 nm-3 nm, and the solvated ion diameter of the ionic liquid electrolytic solution is larger than 5 nm. Besides, the carbon electrode using the porous carbon material of the present disclosure is also suitable to be operated in an organic solvent electrolytic solution.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:
1. A porous carbon material, comprising:
 a porous carbon structure having a plurality of macropores, a plurality of mesopores and a plurality of micropores,
  wherein each of the macropores has a diameter larger than 50 nanometers, each of the mesopores has a diameter ranging from 2 nanometers to 50 nanometers, and each of the micropores has a diameter less than 2 nanometers, wherein based on the total pore volume of the porous carbon structure, a distribution proportion of the pore volume of the macropores ranges from 10-25%, a distribution proportion of the pore volume of the mesopores ranges from 20-80%, and a distribution proportion of the pore volume of the micropores ranges from 0.01-20%, wherein the mesopores have three main pore diameters, wherein the three main pore diameters are 2-4 nm, 5-15 nm and 20-50 nm, respectively, wherein based on the total pore volume of the mesopores, a distribution proportion of the pore volume of the mesopores with the diameter of 2-4 nm ranges from 5-20%, a distribution proportion of the ore volume of the mesopores with the diameter of 5-15 nm ranges from 15-35%, and a distribution proportion of the pore volume of the mesopores with the diameter of 20-50 nm ranges from 20-40%.

2. The porous carbon material as claimed in claim 1, wherein the average pore diameter of the porous carbon structure ranges from about 2 nm to about 15 nm.

3. A supercapacitor, comprising:
a first electrode;
a second electrode;
a separator film sandwiched between the first electrode and the second electrode;
a carbon electrode comprising a porous carbon material as claimed in claim 1, wherein the carbon electrode is disposed between the first electrode and the separator film and between the second electrode and the separator film; and
an electrolytic solution disposed between the first electrode and the separator film and between the second electrode and the separator film to fill the macropores, the mesopores and the micropores of the porous carbon structure of the porous carbon material.

4. The supercapacitor as claimed in claim 3, wherein the electrolytic solution is an ionic liquid electrolytic solution, an organic solvent electrolytic solution or an aqueous solution electrolytic solution.

5. The supercapacitor as claimed in claim 4, wherein the ionic liquid electrolytic solution has an operating voltage ranging from about 3.6V to about 5V, the organic solvent electrolytic solution has an operating voltage ranging from about 2V to about 2.7V, and the aqueous solution electrolytic solution has an operating voltage ranging from about 1V to about 1.2V.

6. The supercapacitor as claimed in claim 3, wherein the carbon electrode further comprises:
a binder mixed with the porous carbon material.

7. The supercapacitor as claimed in claim 6, wherein the binder is a fluoro binder, and the weight ratio of the binder to the porous carbon material ranges from 5% to 15%.

* * * * *